No. 870,784. PATENTED NOV. 12, 1907.
G. HUFF.
DOG COLLAR.
APPLICATION FILED OCT. 1, 1906.

Witnesses
C. C. Holly
J. Townsend

Inventor
George Huff.
by James R. Townsend
his Atty.

UNITED STATES PATENT OFFICE.

GEORGE HUFF, OF TROPICO, CALIFORNIA.

DOG-COLLAR.

No. 870,784.  Specification of Letters Patent.  Patented Nov. 12, 1907.

Application filed October 1, 1906. Serial No. 337,031.

*To all whom it may concern:*

Be it known that I, GEORGE HUFF, a citizen of the United States, residing at Tropico, in the county of Los Angeles and State of California, have invented a new and useful Dog-Collar, of which the following is a specification.

It is one of the objects of this invention to provide a dog collar which will afford convenient means for leading or holding a dog, and which will not impede the dog in its movements when the collar is not adjusted for holding the dog.

The invention comprises a dog collar provided with a take-up and a line carried by the take-up, whereby the line may be used to hold the dog while this is desirable, and may be taken up and housed in the collar out of the way where it will not interfere with the dog's movements or be liable to be broken or damaged, but will be ready for instant use whenever occasion requires.

This invention is designed to take the place of pocket chains and other devices designed to be used to lead the dog when on crowded streets, parks or at other places and by which the dog may be led from or to places where the dog is to be allowed to run free.

The invention is capable of embodiment in various ways, and I shall illustrate and describe the same in that embodiment which I at present deem most desirable, in which a line partly formed of steel tape and partly of chain sections fastened thereto, is fastened at one end to a post that serves as a spool and is carried by the case which houses the line. The outer free end of said line is connected with a ring which may be brought over and around the case and may be fastened thereto by any form of spring or other fastening.

Various forms of line may be used, and I contemplate using a thin line made of numerous strands of steel or other suitable wire. Such matters of detail, however, may be changed without departing from the main invention.

My invention includes the device, combinations and parts hereinafter more particularly set forth and claimed.

The accompanying drawings illustrate the invention in one of the forms of its embodiment.

Figure 1:
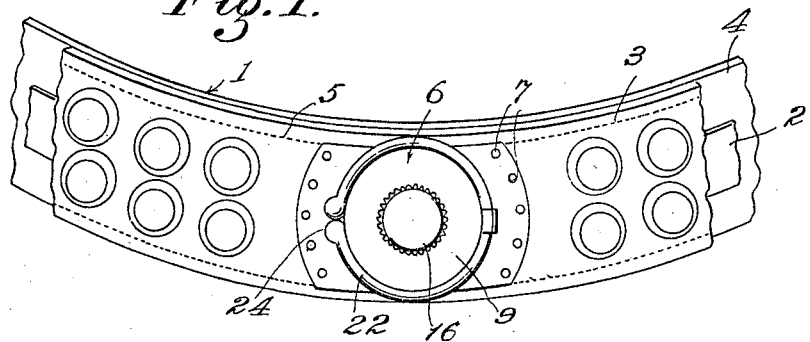
Figure 2:
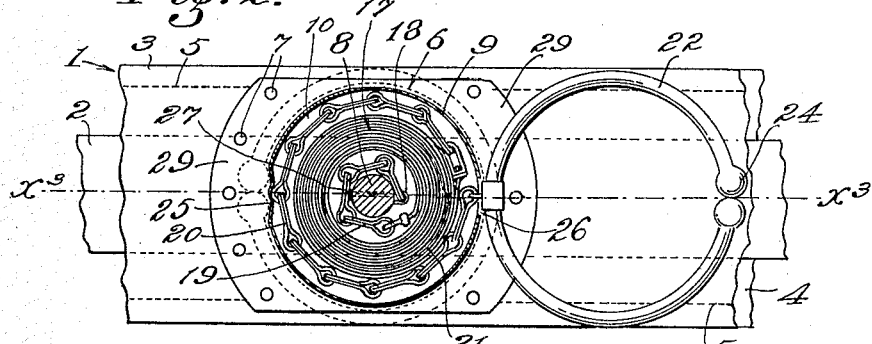
Figure 3:
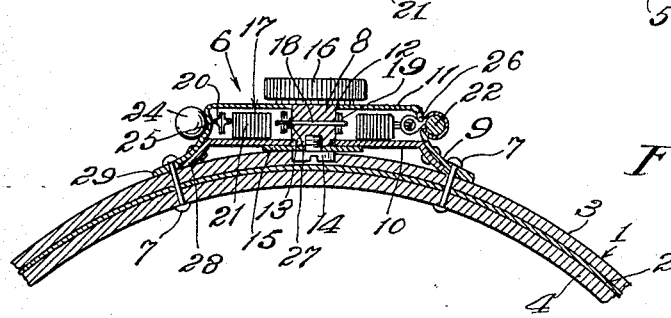

Figure 1 is a fragmental view of a dog-collar constructed in accordance with this invention. The fastening means by which the collar is to be secured on the neck of the animal, are broken away to contract the view. It is to be understood that any requisite form of fastening means may be employed. Fig. 2 is a fragmental view of the collar omitting the top of the shell of the case in which the line may be housed, the spool being shown in section. Fig. 3 is a fragmental section on line indicated by $x^3$, Fig. 2.

1 designates the band of a dog-collar embodying my invention, the same comprising an interior steel strip 2 and two exterior covering strips 3, 4, secured together by stitches 5.

6 in a general way designates a take-up mounted on the band and secured thereto by rivets 7, and comprising a post or spool 8 held by a frame or casing which comprises an outer shell 9 that is flared and flanged at its lower end, and a base plate 10 which fits the open end of the case and forms the bottom thereof.

The case 9 is provided at its top 11 with an opening 12, and the base plate 10 is provided with an opening 13 that is of less size than, and coaxial of the opening 12; and the post or spool 8 is stepped to fit the openings 12 and 13 through which it is inserted, being held in place by a screw 14 that engages the base plate 10 desirably through the medium of a washer 15 and is screwed into the spool 8.

The spool is provided with a milled knob 16 so that said knob may be turned by hand to take up the line 17 that is fastened to the spool 8 by suitable means as a bolt 18. The line 17 may be constructed in various ways. In the drawing it is shown as constructed of two sections 19, 20, of fine chain, and an intermediate section 21 of steel tape.

22 designates a ring fastened to the chain 20 which is connected to the tape and forms the free end of the line. Said ring is of approximately the diameter of the case of the take-up 6, and is adapted to fit over and upon said take-up case, as shown in solid lines in Figs. 1 and 3, and the same may be spring-held thereon by any form of catch which may be applied to the case or to the ring, at the pleasure of the constructor. In the drawing, the ring is an open spring ring having knobs 24 at the ends to enter a depression 25 in the case. In this instance the spring of the ring will be depended upon for seating the knobs when the ring embraces the case. The knobs and niche or depression 25 thus form means for detachably holding the ring stationary relative to the collar when the line is wound on the spool. The outer shell 9 is provided with a side opening 26 to admit the line, and to allow the same to be drawn out of and to be taken up into the cavity of the case.

In practice, to assemble the parts, the spool may be inserted through the top of the shell and seated in the opening 12. Then the bolt 18 with its line may be inserted through the side opening 26 and through a perforation provided in the spool, and fastened by any suitable means as a nut 27. Then the base plate 10 may be inserted into the flaring open end of the shell and brought over the stepped free end of the spool and secured by a screw 14 screwed into the end of the spool 8 coaxially therewith, the washer 15 being provided to cause the thrust of the screw to come forcibly against the base plate 10 which is provided with a flaring portion 28 to engage flanges 29 of the shell 9. When the screw 14 is screwed home, the parts are securely fastened together and the spool may be rotated by means of the milled knob 16, thus to take up the line. When the line is fully taken up and housed inside the case, the ring 22 may be brought into position around the shell of the case and held in place by the spring-catch formed by the parts 24 entering the indentation 25, as shown in the drawing. When it is desired to use the line for leading the dog, the ring 22 may be unsnapped and brought into the position shown in Fig. 2, and thereupon the line may be drawn out its full extent and the dog led thereby. Whenever it is desired to allow the dog to run free, the take-up may be operated to take up the line and house it inside the case, whereupon the ring may be secured in place and the dog will be at freedom.

What I claim is:

1. A dog collar band, a take-up thereon, and a line carried by the take-up.

2. A dog-collar, a take-up thereon, a line carried by the take-up, and means on the free end of the line to detachably fasten said free end of the line to the take-up.

3. A dog-collar, a case thereon, a spool in the case, means to rotate the spool, and a line extending into the case and having one end fastened to the spool.

4. A dog-collar, a case thereon, a spool in the case, a knob outside the case to turn the spool, and a line fastened to the spool and extending through the case.

5. A dog collar, a case thereon provided with a depression, a spool in the case, a knob on the spool outside the case, a line on the spool extending outside the case, and an open ring on the line, the same being provided with knobs to engage in the depression in the case for detachably holding the ring stationary relative to the collar when the line is wound on the spool.

6. A dog-collar, a shell open at the bottom and provided with a base flange and with holes, one in its top and one in its side; a base plate in the bottom of the shell and provided with a hole coaxial with the hole in the top of the shell, a spool extending through said coaxial holes, means to fasten the spool in the base plate, means to rotate the spool, and a line attached to the spool and extending through the side hole to the outside of the case.

7. The combination with a dog collar of a shell provided with a flanged base, a plate fitted in the base of the shell, said shell and plate being centrally perforated; a spool in said perforations and provided with an enlarged head; means for holding the spool in the base plate, and a line on said spool and extending through the shell.

8. The combination with a dog collar of a shell provided with a flanged base, a plate fitted in the base of the shell, said shell and plate being centrally perforated; a spool in said perforations and provided with an enlarged head, a screw for holding the spool in the base plate, and a line on said spool and extending through the shell.

9. A dog-collar, a hollow shell flared at the base and flanged to fit the collar, a plate inside the flared portion, said shell and plate being provided with central holes; a spool having a head and being reduced in diameter to enter said holes, means securing the spool in the base plate, rivets through the flange and collar, and a line extending through the case and attached to the spool.

10. A dog-collar provided with a metal strap and a covering therefor, a shell having a flanged base, a plate in such base, a spool having a head and extending through the shell and plate and adapted to rotate therein, rivets through the flange and metal strap, and a line extending through the shell and fastened to the spool.

In testimony whereof, I have hereunto set my hand at Los Angeles California this 24th day of September 1906.

GEORGE HUFF.

In presence of—
JAMES P. TOWNSEND,
M. BEULAH TOWNSEND.